(12) United States Patent
Dickelman

(10) Patent No.: US 12,400,207 B1
(45) Date of Patent: Aug. 26, 2025

(54) BUYER ROUTING ARRANGEMENTS AND METHODS FOR DISPARATE NETWORK SYSTEMS

(71) Applicant: U.S. Bank National Association, Cincinnati, OH (US)

(72) Inventor: Mark Dickelman, Inverness, IL (US)

(73) Assignee: U.S. Bank National Association, Cincinnati, OH (US)

( * ) Notice: Subject to any disclaimer, the term of this patent is extended or adjusted under 35 U.S.C. 154(b) by 271 days.

(21) Appl. No.: 17/952,625

(22) Filed: Sep. 26, 2022

Related U.S. Application Data

(63) Continuation of application No. 17/087,859, filed on Nov. 3, 2020, now Pat. No. 11,455,623, which is a
(Continued)

(51) Int. Cl.
  *G06Q 20/22* (2012.01)
  *G06Q 20/02* (2012.01)
  (Continued)

(52) U.S. Cl.
  CPC ........... *G06Q 20/227* (2013.01); *G06Q 20/02* (2013.01); *G06Q 20/023* (2013.01);
  (Continued)

(58) Field of Classification Search
  CPC .... G06Q 20/227; G06Q 20/02; G06Q 20/023; G06Q 20/027; G06Q 20/04; G06Q 20/10;
  (Continued)

(56) References Cited

U.S. PATENT DOCUMENTS

| 5,465,206 A | 11/1995 | Hilt et al. |
| 5,596,642 A | 1/1997 | Davis et al. |

(Continued)

OTHER PUBLICATIONS

U.S. Appl. No. 17/087,859, filed Nov. 3, 2020, U.S. Pat. No. 11,455,623, Patented.
(Continued)

*Primary Examiner* — A. Hunter Wilder
(74) *Attorney, Agent, or Firm* — ALSTON & BIRD LLP

(57) ABSTRACT

In one example, electronic transaction data sets are processed for a multitude of disparate transactions using a plurality of autonomous networks. Circuitry receives and/or processes electronic transaction data to identify a user via information provided in the transaction data, and uses the identification to access profile information for selecting one of a plurality of networks. In this example, a user can be identified using one of a plurality of identification approaches (e.g., different account IDs), and such identification can be used for retrieving and using electronic profile data to select a transaction network for the user, which may be completely independent from the identification. Data is accordingly configured so that the selected network can receive and process the data, such as by configuring the data into a network-specific format and/or communicating the data using network-specific protocols. The configured data is transmitted to the selected network.

20 Claims, 6 Drawing Sheets

Related U.S. Application Data continuation of application No. 16/518,664, filed on Jul. 22, 2019, now Pat. No. 10,825,020, which is a continuation of application No. 15/009,624, filed on Jan. 28, 2016, now Pat. No. 10,360,559, which is a continuation of application No. 12/323,134, filed on Nov. 25, 2008, now Pat. No. 9,251,510.

(60) Provisional application No. 60/991,385, filed on Nov. 30, 2007.

(51) Int. Cl.
| | | |
|---|---|---|
| *G06Q 20/04* | (2012.01) | |
| *G06Q 20/10* | (2012.01) | |
| *G06Q 20/38* | (2012.01) | |
| *G06Q 20/40* | (2012.01) | |
| *G06Q 30/04* | (2012.01) | |
| *G06Q 40/12* | (2023.01) | |

(52) U.S. Cl.
CPC .......... *G06Q 20/027* (2013.01); *G06Q 20/04* (2013.01); *G06Q 20/10* (2013.01); *G06Q 20/38* (2013.01); *G06Q 20/40* (2013.01); *G06Q 30/04* (2013.01); *G06Q 40/12* (2013.12)

(58) Field of Classification Search
CPC ........ G06Q 20/38; G06Q 20/40; G06Q 30/04; G06Q 40/12
See application file for complete search history.

(56) References Cited

U.S. PATENT DOCUMENTS

| | | | |
|---|---|---|---|
| 5,596,643 A | 1/1997 | Davis et al. | |
| 5,649,117 A | 7/1997 | Landry | |
| 5,649,118 A | 7/1997 | Carlisle et al. | |
| 5,650,604 A | 7/1997 | Marcous et al. | |
| 5,717,989 A | 2/1998 | Tozzoli et al. | |
| 6,070,150 A | 5/2000 | Remington et al. | |
| 6,292,789 B1 | 9/2001 | Schutzer | |
| 6,298,335 B1 | 10/2001 | Bernstein | |
| 6,529,187 B1 | 3/2003 | Dickelman | |
| 7,092,913 B2 | 8/2006 | Cannon, Jr. | |
| 7,174,302 B2 | 2/2007 | Patricelli et al. | |
| 7,280,981 B2 | 10/2007 | Huang et al. | |
| 7,426,492 B1* | 9/2008 | Bishop .................. | G06Q 20/12 705/38 |
| 7,464,859 B1 | 12/2008 | Hawkins | |
| 7,475,808 B1* | 1/2009 | Bishop .................. | G06Q 20/40 235/379 |
| 7,584,151 B2 | 9/2009 | Wells et al. | |
| 7,590,557 B2 | 9/2009 | Harrison et al. | |
| 7,627,523 B1 | 12/2009 | Symonds et al. | |
| 7,661,586 B2 | 2/2010 | Robbins et al. | |
| 7,664,690 B2 | 2/2010 | Dirnberger et al. | |
| 7,680,679 B1 | 3/2010 | Patricelli et al. | |
| 7,702,530 B2 | 4/2010 | Pearson | |
| 7,702,553 B1 | 4/2010 | Dickelman | |
| 7,702,577 B1 | 4/2010 | Dickelman | |
| 7,711,621 B2 | 5/2010 | Huang et al. | |
| 2001/0014878 A1 | 8/2001 | Mitra et al. | |
| 2002/0002495 A1 | 1/2002 | Ullman | |
| 2002/0111886 A1 | 8/2002 | Chenevich et al. | |
| 2002/0111915 A1 | 8/2002 | Clemens et al. | |
| 2002/0111916 A1* | 8/2002 | Coronna ............ | G06Q 20/382 705/40 |
| 2002/0145051 A1 | 10/2002 | Charrin | |
| 2002/0184147 A1 | 12/2002 | Boulger | |
| 2003/0004867 A1* | 1/2003 | Kight .................... | G06Q 20/04 705/39 |
| 2003/0009382 A1* | 1/2003 | D'Arbeloff ............ | G06Q 20/20 705/17 |
| 2003/0023549 A1 | 1/2003 | Armes et al. | |
| 2003/0061147 A1 | 3/2003 | Fluhr et al. | |
| 2003/0061157 A1 | 3/2003 | Hirka et al. | |
| 2003/0233327 A1* | 12/2003 | Keresman, III ....... | G06Q 20/12 705/44 |
| 2004/0024703 A1 | 2/2004 | Roskind | |
| 2004/0030657 A1 | 2/2004 | Holm-Blagg et al. | |
| 2004/0044621 A1 | 3/2004 | Huang et al. | |
| 2004/0080691 A1 | 4/2004 | Mi et al. | |
| 2004/0093302 A1 | 5/2004 | Baker et al. | |
| 2005/0060579 A1 | 3/2005 | Dickelman et al. | |
| 2005/0077350 A1 | 4/2005 | Courtion et al. | |
| 2005/0222961 A1 | 10/2005 | Staib et al. | |
| 2005/0267840 A1 | 12/2005 | Holm-Blagg et al. | |
| 2006/0089906 A1 | 4/2006 | Rowley | |
| 2006/0116957 A1 | 6/2006 | May et al. | |
| 2006/0224449 A1 | 10/2006 | Byerley et al. | |
| 2007/0038577 A1 | 2/2007 | Werner et al. | |
| 2007/0282743 A1 | 12/2007 | Lovelett et al. | |
| 2008/0046358 A1 | 2/2008 | Holm-Blagg et al. | |
| 2008/0091596 A1 | 4/2008 | Labaton | |
| 2008/0103985 A1 | 5/2008 | Huang et al. | |
| 2008/0184147 A1 | 7/2008 | Anderson et al. | |
| 2008/0275748 A1 | 11/2008 | John | |
| 2008/0306838 A1 | 12/2008 | Fleet et al. | |
| 2008/0307034 A1 | 12/2008 | Fleet et al. | |
| 2009/0030848 A1 | 1/2009 | Wendel | |
| 2009/0112747 A1 | 4/2009 | Mullen et al. | |
| 2009/0164330 A1 | 6/2009 | Bishop et al. | |

OTHER PUBLICATIONS

U.S. Appl. No. 16/518,664, filed Jul. 22, 2019, U.S. Pat. No. 10,825,020, Patented.
U.S. Appl. No. 15/009,624, filed Jan. 28, 2016, U.S. Pat. No. 10,360,559, Patented.
U.S. Appl. No. 12/323,134, filed Nov. 25, 2008, U.S. Pat. No. 9,251,510, Patented.

* cited by examiner

BUYER ROUTING ARRANGEMENTS AND METHODS FOR DISPARATE NETWORK SYSTEMS

FIELD OF THE INVENTION

This invention relates generally to computer-automated devices, systems and methods relating to data processing involving accounting records, and as an example, to systems and methods for automated computer systems and networks implemented as may be found in a control center of a financial institution.

BACKGROUND

Computer systems and networks that process data in control centers for financial institutions have struggled to keep up with the ever increasingly complex and expanding variety of electronic transaction and accounting data, particularly as more and more transactions are carried out using electronic payment, which is often a credit-based payment. Electronic data used in effecting payment relates and leads up to implementations of payment systems and associated payment networks, which generally employ proprietary-type processing functions and require relatively complex interactivity with electronic systems operated by entities for which payment is processed (e.g., merchant point-of-sale (POS) devices).

Generally, associated payment networks involve two primary components. The first component is a seller or merchant access network (e.g., Elavon®) that provides connection to the POS devices (e.g., directly or via merchant internal networks) and identification of the type of payment account (e.g., Visa® or Voyager®). A second component includes payment processing networks that process payment instructions based on established agreements by parties participating in the processing of payment. Generally, these payment processing networks are one of two different categories, proprietary networks (e.g., Voyager®) or association networks. Examples of association networks include the networks provided by VISA® and MASTERCARD® and/or the particular acquiring/issuing banks. For a particular transaction, the operator of the association network controls the flow of funds for the transaction. Often, this includes a fee that is passed on to the seller, such as a percentage of the transaction. The participating sellers have an agreement with the network (e.g., VISA or MASTERCARD), but do not have a transactional relationship between one another with respect to the association network transactions.

These types of transactions have generally been implemented by sellers having an existing relationship with a particular bank, and often involve the use of a transaction card or corresponding account involving one or more of a credit or debit type of account structure. When a purchase is made, the seller sends transaction information to the bank, which is sometimes referred to as the acquiring bank. The acquiring bank can forward payment information to another bank that issued the buyer's account (e.g., a credit card issuer), which is often referred to as an issuing bank. In many instances, payment processing networks assign interchange fees for these types of transactions. These fees are paid between the parties based on the type of transaction, authentication and location, and may be passed on to the seller.

An example proprietary network involves a merchant-provided in-store credit or debit account (e.g., an account provided by Target Corporation for use in purchasing goods from a store operated thereby). A seller or seller-contracted third party facilitates the settlement, authorization and/or other functions associated with transactions involving the in-store account. In some instances, sellers form bilateral agreements with other sellers to allow use of a network by multiple sellers and/or to coordinate the use of multiple networks between multiple sellers. For instance, two department stores may form an agreement to allow the use of a common proprietary network cards/account at either store, or they may allow use of two different proprietary network cards/accounts (i.e., one from each store) at either store.

A few networks are operated to allow a single (multi-purpose) card (e.g., a physical transaction card with data thereon, or a corresponding account) to provide access to more than one related credit and/or debit type of account. The card interfaces with a network that would otherwise support one or more of the accounts, and a user of the card (cardholder) can designate a desired one of the accounts to use. However, the buyer must still carry the multi-purpose card for use and can only use the multi-purpose card at locations that support that particular card, and the transactions are generally processed using the selected account and its related proprietary-type of payment network.

In this complex and ever expanding background of various payment networks, consumers have an increasing number of accounts from which they can access funds for purchases (e.g., credit, debit, insurance, health-savings accounts, money markets, investment and retirement). These accounts can vary with respect to their respective fees, tax implications, interest rates, limitations on withdraw amounts and a number of other properties. Often the consumer is forced to spend considerable time and effort to manage such accounts and associated transactions. For example, considerable time and effort can be expended in determining how to best apply specific transactions and/or purchased items to the various accounts. In some instances, the actual implementation of such a determination can be just as difficult.

Another challenge to the implementation and management of transaction processing systems and, to some degree, merchant-specific types of accounts relates to the lack of volume of buyers (and/or sellers) that may be associated with the systems and accounts. For instance, relatively small merchants may find it difficult to promote and operate a transaction account and related system where the volume of users is relatively low.

The above and other matters remain challenging to the implementation, operation and sustained growth of card and related types of accounts, and the electronic transactions and interactions related to the same.

SUMMARY

The present invention is exemplified in a number of embodiments, implementations and applications, some of which are summarized below.

According to an example embodiment, an electronic transaction data routing arrangement facilitates electronic payment between disparate, autonomous payment networks for sellers providing goods or services and for buyers paying for the goods or services, using buyer profile data that specifies a plurality of disparate, autonomous payment networks for each buyer. The routing arrangement includes an interface circuit and a software-programmed computer circuit. The interface circuit receives sets of electronic transaction data from a seller-based point-of-sale system, each set including data to identify a buyer, a seller and a transaction amount. The software-programmed computer circuit is configured to carry out the following steps, for each set of received transaction data pertaining to a particular buyer. Electronic buyer identification data is identified for the particular buyer using information in the received transaction data. The received transaction data is then processed with profile data electronically associated with the buyer identification data, to select one of a plurality of buyer payment networks as a source of electronic funds to cover payment for a transaction amount in the transaction data. Payment data is configured from the received transaction data using payment network profile configuration information for the selected buyer payment network, for electronic payment processing by the selected buyer payment network. The configured payment data is then transmitted to the selected buyer payment network.

According to another example embodiment, a computer-implemented method facilitates electronic payment between disparate, autonomous payment networks for sellers providing goods or services and for buyers paying for the goods or services, using buyer profile data that specifies a plurality of disparate, autonomous payment networks for each buyer. The method includes receiving sets of electronic transaction data from a seller-based point-of-sale system, each set including data to identify a buyer, a seller and a transaction amount. The following steps are carried out for each set of received transaction data pertaining to a particular buyer. Electronic buyer identification data is identified for the particular buyer using information in the received transaction data. The received transaction data is then processed with profile data electronically associated with the buyer identification data, to select one of a plurality of buyer payment networks as a source of electronic funds to cover payment for a transaction amount in the transaction data. Payment data is configured from the received transaction data using payment network profile configuration information for the selected buyer payment network, for electronic payment processing by the selected buyer payment network. The configured payment data is then transmitted to the selected buyer payment network.

Other example embodiments are directed to a computer-readable storage medium, for use by a software-programmed computer processor circuit configured with software, that when executed by a processor therein implements the aforesaid steps to facilitate electronic payment between disparate, autonomous payment networks.

The above summary is not intended to describe each illustrated embodiment or every implementation of the present invention.

BRIEF DESCRIPTION OF THE DRAWINGS

The invention may be more completely understood in consideration of the detailed description of various embodiments of the invention that follows in connection with the accompanying drawings, in which.

Figure 1A:
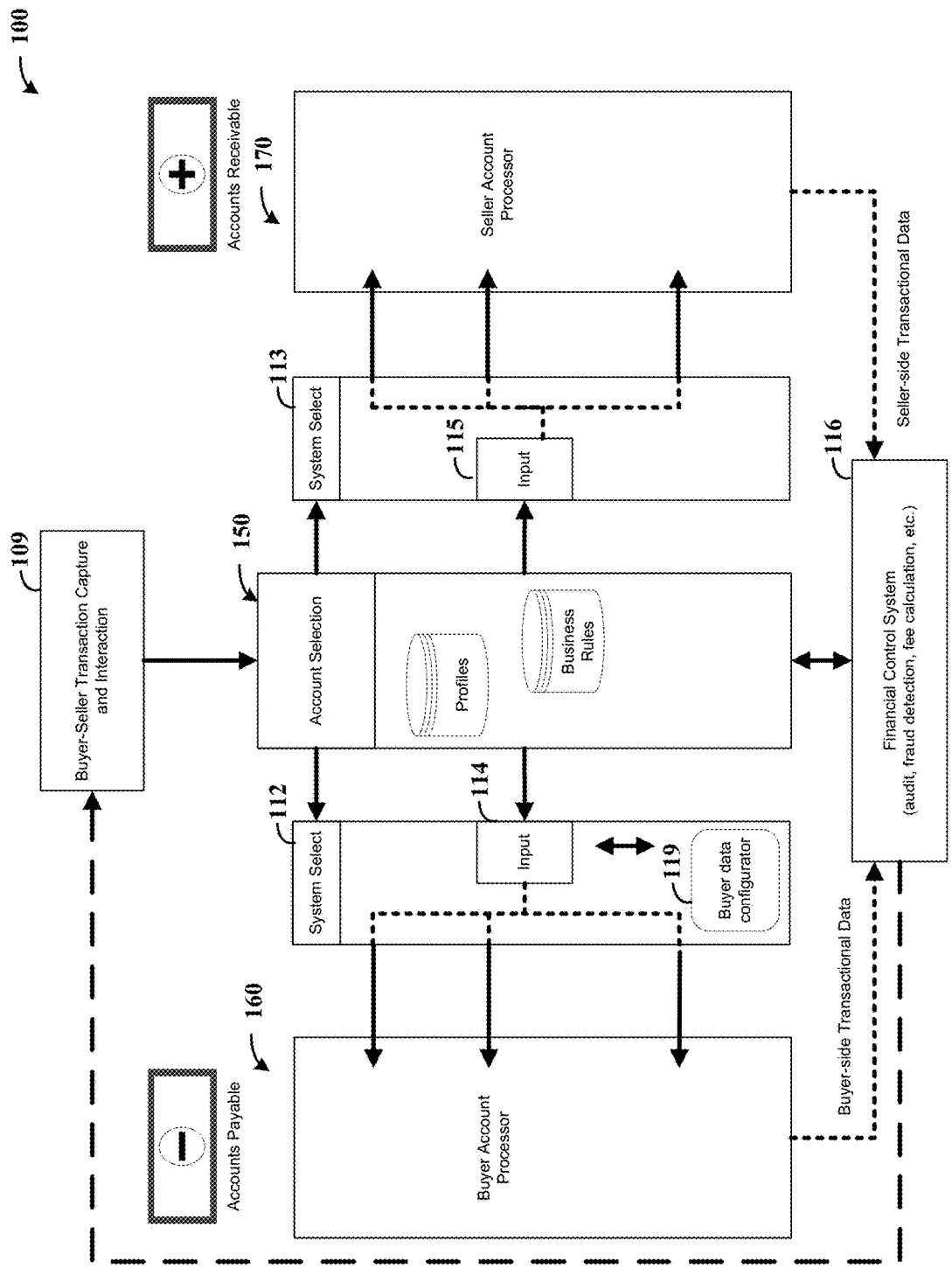
FIG. 1A shows a system for implementing a transaction using disparate seller and buyer networks, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of transaction processing systems and related integrated communications, management control, and has been found to be particularly useful for applications involving disparate, autonomous payment networks. While the present invention is not necessarily limited to such approaches, various aspects of the invention may be appreciated through a discussion of various examples using these and other contexts.

A number of different embodiments of the present invention are directed to one or more of the components and methods described, in this document, in connection with disparate payment systems. A discussion of the overall system functionality can be useful in understanding the individual components and methods.

Consistent with an example embodiment of the present invention, an approach to processing payment involves controlling interactions between disparate, autonomous payment processing networks to process different payment aspects for a common set of transaction data received for a particular transaction. For instance, when a merchant (i.e., seller) transmits point-of-sale purchase data including a transaction amount and buyer's account data (e.g., obtained from a credit-type or debit-type card or related account number associated therewith), an integrated processor receives the point-of-sale data and coordinates electronic funds transfers with two or more of the autonomous networks. In this context, a single card or account can be used as a manner in which to access a plurality of payment networks, and payment for a common transaction can be effected using disparate, autonomous networks that, absent the integrated processor, would not otherwise be capable of communicating with one another. In many aspects, such an approach involves interacting with payment networks configured and operated for operating independently, to respectively provide payment to a merchant and effect settlement from a buyer, with these functions now carried out via the integrated processor.

These payment processing approaches are amenable to use in processing payment using a multitude of different payment approaches and scenarios involving one or more accounts and participating networks for buyers, merchants or other transaction participants. For example, some embodiments are directed to providing payment from a buyer using a first payment processing network (e.g., a Elavon® and/or VISA® network as described above) to obtain account information for the buyer, and providing settlement to a merchant using a different account (and its related payment network) for the buyer. Other embodiments are directed to using different accounts and related payment networks for effecting payment and for providing settlement for the buyer. Other embodiments are directed to using different accounts and related payment networks for collecting an initial pre-payment (e.g., an immediate payment from a third party) for collecting subsequent payment from the buyer and, where appropriate, for providing settlement for the pre-payment. Still other embodiments are directed to providing payment from a buyer using an account for the buyer and its related payment processing network, and providing electronic funds from the payment to a merchant account that uses a different payment network. Other combinations of networks are also used in connection with various embodiments.

As should be appreciated, the central/integrated processor can thus coordinate interactions between a multitude of different accounts and different payment networks, and can do so using a single account for a particular transaction participant in order to access other accounts for the participant. For instance in a transaction involving the sale of goods or services from a seller to a buyer, a payment network can be selected for the buyer that is disparate from the payment network used by seller by using a standardized card or a proprietary network, or other buyer identification sufficient upon which to authorize payment. This can be useful for allowing a buyer to use a standardized card and a seller having only access to (or preferring the use of) a proprietary network. Payment authorization may involve an audit, which may include comparing data from one or more of a buyer-based audit, seller-based audit or an audit based upon a third party operating the central/integrated processor. The results of the audit can be provided to the selected networks and used, for example as indication that the transaction can go forward (e.g., validation regarding the transaction amount and source).

Payment accounts and related networks are selected using one or more of a variety of approaches. In some embodiments, user profiles with any appropriate rules are stored and used to identify and select an available account for effecting payment for a transaction. These profiles (and rules) can be stored for buyers and, as appropriate, sellers. In some applications, an account and related payment network is selected automatically using profiles and related rules. In other instances, user input is obtained in order to select a payment account, to allow a buyer and/or seller to directly select and control the use of a particular payment account. In all of these instances, parties to a particular transaction need not have direct knowledge of account and related payment network for other parties to the transaction, and further do not need to participate in any agreement with a payment network used by another party. In addition, such approaches may be carried out using a processor (e.g., a computer) that uses profiles, rules and transaction information to selecting, routing and otherwise implementing associated accounts and related payment networks.

While not necessarily limited thereto, various embodiments are directed to the implementation of processor arrangements and systems, consistent with discussion herein, at financial institutions such as banking institutions that are well suited for making use of network and account access. For instance, banking institutions have many existing interfaces to payment networks, and many payment networks are linked to accounts held at a banking institution. The payment networks operate by transferring money to and from these accounts, thereby completing transactions. Other payment networks use local banking institutions as intermediaries to transfer funds. The use of a bank can be beneficial for a number of reasons including, but not limited to, secured transactions, federal insurance and relative stability; however, disparate payment networks do not have automated mechanisms to transfer funds therebetween.

Aspects of the present invention, when implemented by a banking institution, can provide automated access between such networks. In some instances, the transactions can be implemented with the transaction details being transparent to the payment networks and/or the individual participants. For example, an individual participant could identify a desired payment network to use without requiring that a front-end payment network (e.g., the payment network associated with the POS transaction) have a pre-existing bilateral agreement with a desired payment network. A specific example of such an instance involves a buyer's use of a credit card to implement a POS transaction. Consistent with one implementation of the present invention, credit card transaction data is received by a banking institution, which can use a payment routing network to select a payment network, other than a payment network associated with the credit card, to complete the transaction. Accordingly, the aspects of the present invention can be particularly useful for providing a centralized routing system that operates using existing autonomous and disparate payment networks. Moreover, these approaches may be carried out using an identification of a user, be that based upon a particular payment account (e.g., a credit card) or based upon another form of identification (e.g., a mobile phone account or a state-issued identification card (e.g., driver's license), where payment is carried out using a wholly different payment account. That is, once a buyer is identified into the system, using one or more of a multitude of identification approaches, payment accounts and networks can be selected and implemented independent from any manner in which that buyer is identified. Seller accounts and networks can be similarly selected.

Turning now to the figures, FIG. 1A shows a system 100 for processing transactions using disparate payment processing networks, according to various example embodiments of the present invention. The system 100 can be operated in accordance with one or more of the above-discussed electronic payment and transaction processing systems and approaches, as well as those discussed in connection with the figures and those claimed. In these contexts, disparate buyer and seller networks may involve networks operating on different accounts that are not recognized or otherwise accessible by other respective buyer and/or seller networks that operate with the system 100, and can be respectively used in processing electronic payment for a transaction using two or more of the disparate networks.

When electronic transaction information is received (e.g., from a merchant's point-of-sale device), the system 100 identifies the buyer in the transaction and determines whether payment for a transaction is appropriate using a set of rules embodied and processed in a financial control system 116. For instance, when a buyer wishes to purchase goods and services from a seller (merchant), the buyer can provide account information such as a credit card number to a seller either physically (i.e., at a store) or electronically when purchasing over the Internet. This information is captured together with sufficient information to identify transaction aspects (e.g., an amount), and is provided to the system 100, which uses the information to approve and otherwise process the payment for the transaction in accordance with the buyer's account rules.

A buyer/seller transaction capture interface 109 captures data for transactions between buyers and sellers using, for example, a network-based interface (e.g., operating over the Internet) and/or a merchant/seller point-of-sale device that captures account information from a buyer (e.g., using an identification card, credit card or debit card). Where a point-of-sale device is used to interact with a buyer, the interaction may simply involve allowing the buyer's card to be swiped, or involve a more complex acquisition of other inputs or selections from the buyer. Numerous other interfaces can also be implemented in accordance with these embodiments, with some of these interfaces and related approaches discussed in further detail herein.

The data captured by the interface 109 varies depending upon the application, and generally includes data pertinent to effecting payment for a transaction, such as identification for a buyer and a seller (and/or their respective accounts), as well as a transaction amount for payment. Where appropriate, other transaction data such as time-stamps, transaction type (e.g., Internet purchase, storefront purchase, utility payments or gasoline purchases), a type of goods or services sold, or security information is also captured. Exemplary types of security information that may be provided with the transaction data include personal pin numbers, biometric data, passwords, social security numbers and interactive authentication data received via an external communication device such as via email or a cellular phone.

An account selection processor 150 uses the captured data together with profiles and business rules to select buyer and seller account/payment systems and input the selections to system selection processors 112 and 113, via inputs 114 and 115. The system selection processors 112 and 113 respond to the inputs by respectively selecting buyer and seller account processors 160 and 170, which each respectively interact with an autonomous payment network. The buyer and seller account processors 160 and 170 respectively interact with payment networks for the particular account for which transactions are processed to process payment from a buyer and provide funds to a seller, less any associated transaction fees. Fee calculation and/or collection may involve, for example, applying standard network fees (e.g., credit card basis points, cost-per-use fee, interest and/or float costs), system implementer cost and associated fees, and fees corresponding to write-offs (e.g., due to disputes and underwriting).

Each of the account selection, system selection and buyer/seller account processor functions may be implemented using, for example, one or more processors that are local and/or separate from one another, and that execute code to carry out the account and system selection and related interaction as appropriate. Account/system selection decisions can thus be made using one or more of a variety of criteria including those discussed above.

A financial control system 116 selectively interacts with one or more of the account selection processor 150 and the buyer and seller account processors 160 and 170 to control financial aspects of transactions. The control system 116 thus may control one or more of auditing for payment authorization or other purposes, fraud detection (e.g., by monitoring activity), fee calculation, compliance with government or other rules/laws, and other related functions. Moreover, this control may be effected using interaction with one or both of the account selection processor 150, buyer processor 160 and seller processor 170, and may further involve modifying aspects of transactions according to such auditing, fraud, compliance and other conditions.

Interaction with buyer and seller payment networks via processors 160 and 170 varies depending upon the application. In some instances, the interface passes transaction data for approval/authorization, such as by passing a transaction amount to a buyer's payment network, and interacts with seller systems (e.g., a point-of-sale terminal) to approve transactions based upon a response from the buyer's network. In these contexts, and as may be implemented in a manner consistent with the above discussion made prior to the introduction of FIG. 1A, the system 100 can be used to provide interaction between disparate buyer and seller payment networks, and a transaction source such as a merchant point-of-sale device or related network-based device. These interactions may be carried out in a manner that would, for example, otherwise not be possible with various networks on the buyer and/or seller sides operating using proprietary processing functions and related programming that are otherwise not amenable to interactive payment processing.

As discussed above, a variety of transactions may be carried out using disparate payment networks using the system 100. In one use-case scenario, a buyer purchasing goods from a merchant uses her credit card at a merchant's store by swiping the credit card through the merchant's card reader. Electronic data from the reader is sent to the interface 109 together with data identifying the seller and an amount for the transaction. The interface 109 provides the electronic data to the account selection processor 150, which uses profiles to identify the buyer and merchant, and business rules to select respective accounts. For instance, the buyer may specify that payments be drawn from her debit card account for transactions at or below $50, and that payments be drawn from her credit card account for transactions above $50. These accounts may or may not have a bearing upon the credit card swiped at the merchant. The merchant may similarly specify (in its business rules) a particular payment network and related account to use for receiving payment from the buyer. The account selection processor 150 accordingly selects an account based upon any such rules, and provides an input (114, 115) to respective system selection processors (112, 113), which select an appropriate account processor to interact with respective payment networks to carry out the buyer and merchant sides of the electronic transaction.

Figure 1B:
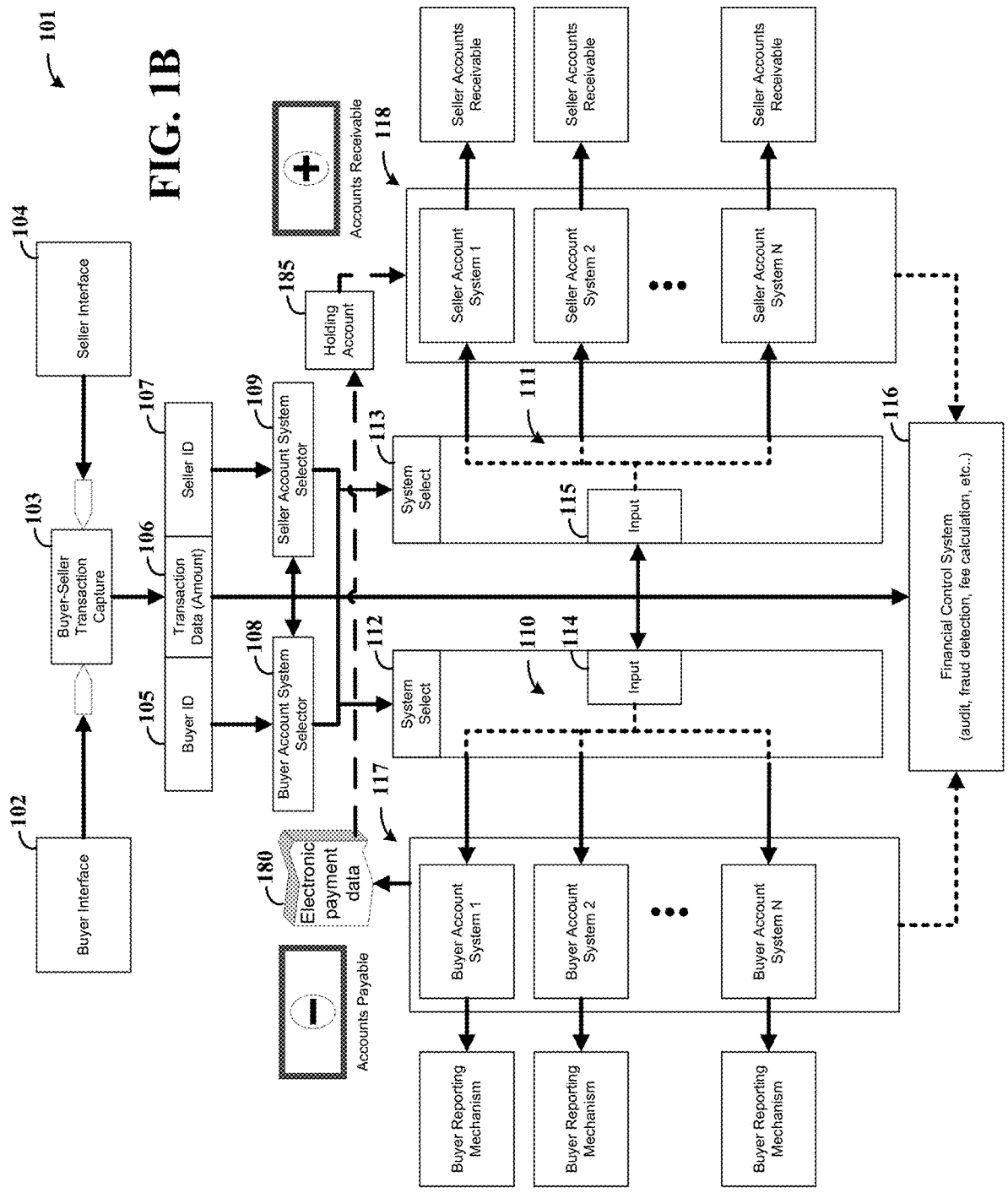
FIG. 1B shows a system for implementing a transaction using disparate seller and buyer networks, according to another example embodiment of the present invention.

FIG. 1B shows a system 101 for transaction processing and operation in a manner similar to that shown in and discussed in connection with the system 100 in FIG. 1A, according to another example embodiment of the present invention. The system 101 includes a buyer interface 102 and a seller interface 104, which may be distinct or part of a common arrangement, and which respectively capture buyer and seller transaction data. The buyer interface may include a computer operating on the Internet to receive account data from the buyer, thus involving distinct and common aspects including a buyer's Internet access appliance and a seller's server. A seller's interface may include a point-of-sale card reading device and accompanying system, which may also effectively interface with the buyer either by simply allowing the buyer to swipe a transaction card (e.g., debit or credit card) or identification, or by acquiring other inputs or selections from the buyer. Numerous other interfaces can also be implemented in accordance with these embodiments, with some of these interfaces and related approaches discussed in further detail herein.

A transaction data capture processor 103 effectively collects and/or provides data including buyer identification 105, seller identification 107 and transaction data 106 including a transaction amount. Where appropriate, the transaction data 106 includes other transaction information such as time-stamps, transaction type, type of goods or services sold, or security information. Exemplary types of security information that may be provided with the transaction data 106 include personal pin numbers, biometric data, passwords, social security numbers and interactive authentication data received via an external communication device such as via Internet-based email, a mobile phone or other handheld device.

The buyer and seller IDs are respectively used for selecting buyer and seller accounts at 108 and 109, which respectively provide that information to system selection and routing processors 108 and 109, which route and process accounts payable and accounts receivable types of electronic data to one of a variety of disparate buyer and seller account systems 117 and 118. For example, as discussed above in FIG. 1A, each of the respective buyer and seller accounts may be selected by retrieving a profile for the participant and using the retrieved profile, together with any business rules, to select an appropriate payment network. In some instances, the selected network can be determined without knowledge of the other participant, such as by selecting a payment network from which to draw funds (or debit) for a buyer, irrespective of the seller's selected payment network by which it expects to receive payment. In other instances, the selection of a payment network for a particular transaction participant (e.g., a buyer) involves also using a profile of the other participant (e.g., a seller), for purposes such as cost savings or security. For instance, a particular network may be selected because a seller has a favorable bilateral agreement with a network that is usable by a buyer transacting with the seller.

In some embodiments, transaction data 105/106/107 is packaged for sending to two different networks, with each network receiving selective information that is proprietary to that network's account or accounts having a bearing upon the transaction. The system 101 separates buyer and seller information (e.g., identification and/or security data) from one another, so that each network receives only that information pertinent to payment approval and/or processing at that network. In this context, the system 101 maintains the confidentiality of account information while allowing disparate networks to function in accordance with their approval and/or processing schemes.

In some implementations, the selected buyer and seller account systems (at 117, 118) interact, through the system 101, for communicating electronic payment data 180 for effecting a funds transfer from a buyer's account into a sellers account. As part of the funds transfer, the funds may be temporarily stored in an effective holding type of account 185, or may be provided by the system 101 before drawn from a buyer's system (e.g., early payment to the seller) with the system 101 collecting funds from the buyer at a later time.

In other embodiments, a buyer or seller may use different payment systems for different types of transactions. For example, a buyer may specify that a payment for a particular transaction be made from a first account and related payment network (e.g., a retailer's transaction card), such that the buyer's account with that retailer is charged. The buyer may then further specify that funds to cover the payment be provided to the first account from a second account, such that the buyer has effectively settled with the first account for the transaction amount, and now carries a balance for the covering funds on the second account. Other uses of different accounts in different manners are similarly carried out for different embodiments, using profiles and/or business rules as appropriate.

The systems and approaches described above and shown in FIGS. 1A and 1n FIG. 1B are amenable to implementation with a variety of different payment networks, point-of-sale acquisition devices and related operational characteristics. Moreover, various embodiments are directed to select aspects of the systems shown in FIG. 1A and/or in FIG. 1B, and can thus be implemented using less than all of the shown components. In some embodiments, a seller-side payment network system is implemented in accordance with the above, to facilitate electronic payment between disparate, autonomous payment networks for sellers providing goods or services and for buyers paying for the goods or services, using seller profile data that specifies a plurality of disparate, autonomous payment networks for each seller.

An interface circuit receives sets of electronic transaction data from a seller-based point-of-sale system, each set including data to identify a buyer, a seller and a transaction amount. Such a circuit may involve, for example, an interface circuit 109 of FIG. 1A operated remote from seller point-of-sale devices (e.g., over a network), or may be implemented at account selector 150 (or corresponding selectors at 108 and 109 of FIG. 1B).

A software-programmed computer circuit is configured to execute the following, for each set of received transaction data pertaining to a particular buyer. Electronic buyer identification data is identified from the transaction data, and used to identify profile data for the buyer as associated with the identification data. The received transaction data is processed with the profile data for the particular buyer to select one of the buyer payment networks as a source of electronic funds provided to cover payment for a transaction amount in the transaction data. Referring again to FIG. 1A, this selection may be carried out at system selector processor 112. Payment data is configured (e.g., generated) from the received transaction data using payment network profile configuration information for the selected buyer payment network, for electronic payment processing by the selected buyer payment network (e.g., using buyer data configurator 119 in processor 112). The configured payment data is transmitted to the selected seller payment network, such as at 160.

In some applications, the processor 112 includes network interface modules (e.g., software-implemented modules) programmed for interfacing specifically and, in some instances, exclusively with a particular buyer network. These modules may, for example, be configured with communications protocols, data format types or other information that makes interaction with each of the various disparate payment networks possible. Similar modules may be implemented at processor 113 for different seller payment networks.

In these contexts, a single type of identification for a particular seller can be used with profile data for that seller to automatically select a payment network among several such networks available to the seller, with automatic data configuration to ensure that the payment network can process the data sent to it.

Payment and settlement between networks, such as those discussed above in connection with FIG. 1A and with FIG. 1B, can be accomplished using a number of different payment and settlement processes. In some embodiments, disparate networks directly communicate with one another where the networks have a bilateral agreement with one other. Transactional data received by each network can be used to reconcile the debit and credits for a transaction by, for example, matching a transaction identifier received by each network. Electronic funds transfer for these approaches can be carried out immediately during transaction processing, or on a periodic basis (e.g., daily). Where the networks directly communicate, they may employ different settlement options depending upon the implementation. The overall system can use network profiles and/or business rules to determine if the networks are compatible, and if so, which settlement rules to implement. In this context a system (e.g., 101) can provide participating networks with data sufficient to allow an appropriate funds transfer for transaction(s) involving each other. Such data may include, for example, an identification of settlement protocols to use, communication methods, or fee calculations. This can be particularly useful for networks that do not have explicit bilateral agreements with one another, but nonetheless, desire to effect electronic funds transfers for payment and/or settlement directly with one another.

In another example, one or more third parties is used to effect settlement. For instance, a financial entity such as a bank can collect from a buyer network while crediting a seller network, and reconciles the collected and credited amounts. This approach can be particularly useful for facilitating transactions between networks that are either incompatible or unwilling to interface directly with one another. In another example, seller and buyer networks may be the same network, thus not requiring interaction to effect payment or settlement.

Each selected network processes transactions according to the network's respectively established protocols. In some cases this includes the billing and reporting functions to the buyer and/or seller participating in transactions. For example, a credit card network can send a statement to the buyer that includes transaction amounts for a periodic cycle, and the buyer is then obligated to repay the proper party within the credit card network. Likewise, the seller could be credited for the value of the transaction through an appropriate network and notified of the transaction details using a transaction statement/report (mailed, online or otherwise).

In a particular embodiment, a portion of one or both systems 100 and 101 is implemented to facilitate population of the system with buyers and/or sellers, who can then transact using one or more accounts and related to which the system has access. In some applications, this population approach involves using a database of eligible buyers and/or sellers to identify potential new participants in the system, who are notified of their eligibility using an acceptable mechanism. For example, a purchase placed by a buyer who is a participant in a network associated with the system can be detected and used to contact and invite the buyer to participate.

Once information is obtained, the population system performs one or more of a number of different actions with this information. For instance, the identified buyer can be immediately notified of their eligibility, such as by notifying the buyer or seller of the option before a transaction is completed. In some instances, the buyer is notified of options involving potential savings or other incentives available to the buyer should he or she choose to participate. Such options may involve using one or more preferred accounts associated with a network other than the network that would otherwise be used by the buyer in the instant transaction. In another instances, the buyer is notified after a transaction has taken place, such as through a targeted mailing or email communication. In still other instances, the buyer is notified of options in conjunction with a subsequent statement or bill.

Figure 2:
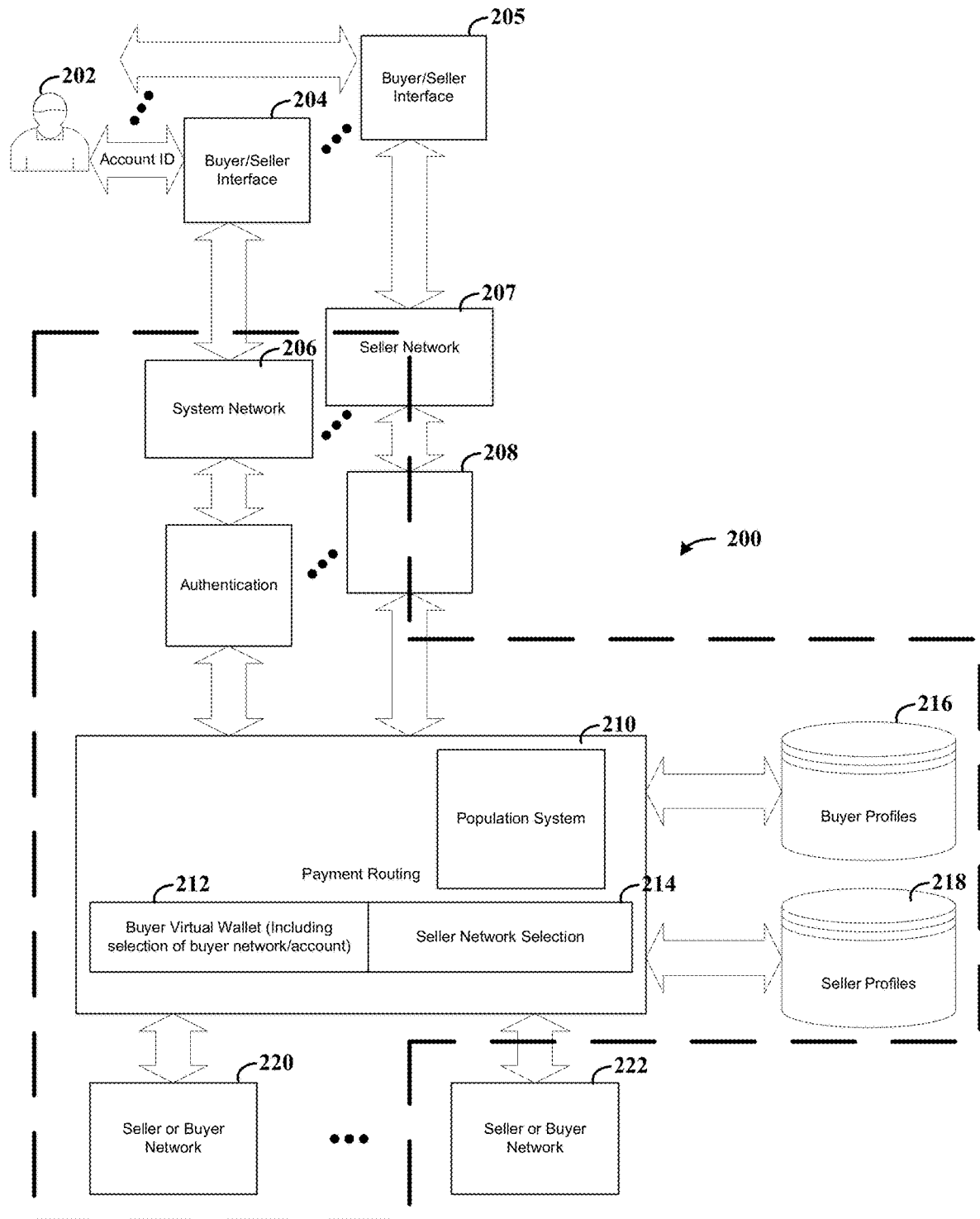
FIG. 2 shows a block diagram for a system, according to another example embodiment of the present invention.

FIG. 2 shows a block diagram for a network selection system for selecting and implementing disparate electronic payment networks of different accounts and related networks, according to another example embodiment of the present invention. Users of the system, represented by user 202 by way of example, access the system through a buyer seller interface, with interfaces 204 and 205 shown by way of example, respectively connecting to internal network 206 and external network 207.

The network 206 directly connects the buyer-seller interface 204 to the system 200, and may involve an access network that is operated by an entity operating the system 200. For example, the system 200 may be operated by a bank that provides debit card services in addition to (or along with) the disparate payment network functionality. When a buyer uses such a debit card, the system 200 can identify whether or not the buyer is a participant of the disparate network systems and act accordingly, or otherwise interface with an appropriate card to identify the buyer for effecting payment.

The network 207 connects the buyer-seller interface 205 to the system 200 by way of an external connection 208, in that network 207 is independently operated (e.g., implements disparate processing and communication functions). In this context, the network 207 may be implemented as a proprietary network such as a network associated with credit cards, debit cards or prepaid cards, and sends data for transactions involving participating sellers to the system 200. The network 207 thus functions to process transactions independent from the system 200 completely (e.g., by processing a credit card transaction involving a buyer and merchant who are both participants in the specific credit card system).

For each of the various participants in the system 200, data for electronic approval and payment for transactions is routed to a selected one of a multitude of networks, with networks 220 and 222 shown by way of example. The selected network is controlled or otherwise interacted with by the operator of system 200, by one or more different entities, or by a combination thereof. A virtual wallet processor 212 executes the selection of an appropriate account and related network for buyers. This virtual wallet approach facilitates buyer access to a number of different accounts on a number of different networks, in essence allowing a buyer to select between different payment options without needing to use the specific identification card (e.g., credit cards and prepaid cards) associated with the selected network.

The virtual wallet processor 212 selects a buyer network using buyer profile data 216, which can include a variety of information relating to the identification and selection of accounts. In some embodiments, the profile data includes a predetermined selection (e.g., made by the buyer) of a buyer network to use, or a set of data upon which account selection may be based (e.g., based upon the type of identification used in the transaction, buyer account status, type of transaction, amount of transaction or data related to the seller).

In other embodiments, the profile data specifies that the buyer be provided options by which a network can be selected, in which instance the virtual wallet processor 212 provides the options via one or more of a variety of approaches, ranging from the use of Internet-based access, communication with a seller interface terminal, or mobile device (e.g., phone) communications. For example, the profile data can be used to determine the networks that are available to the buyer and provide that data to the buyer for selection of the appropriate network. This can be done in real time (e.g., using merchant interface) or at a future point in time (e.g., through other communication, such as over the Internet). Available accounts presented for selection to the buyer may be presented together with information regarding the differences between selecting different accounts, such as associated fees, discounts or incentive programs, thereby allowing the buyer to make an informed decision.

A seller network selection processor 214 selects a seller network in a manner that may, for example, be similar to the selection of a buyer network. In some instances, the seller network is predetermined (e.g., by the seller), and in another instances, the seller network is selected using seller profile criteria, and in other instances is selected in response to input from the seller.

In some embodiments, the system 200 includes a population system 210 that populates the system with active and possible (or approved) participants including buyers who have accounts associated with networks that can be accessed via system 200. The population system 210 uses a database of information regarding potential participants to target those potential participants who have accounts amenable to use with the system 200 and/or are likely to participate. The population system 210 may select an approach to contacting potential participants, such as by direct mailing, email notification, notification on a billing or other statement or a direct telephone call. These and other approaches may be carried out in a manner similar to that discussed above in connection with other population approaches.

Figure 3:
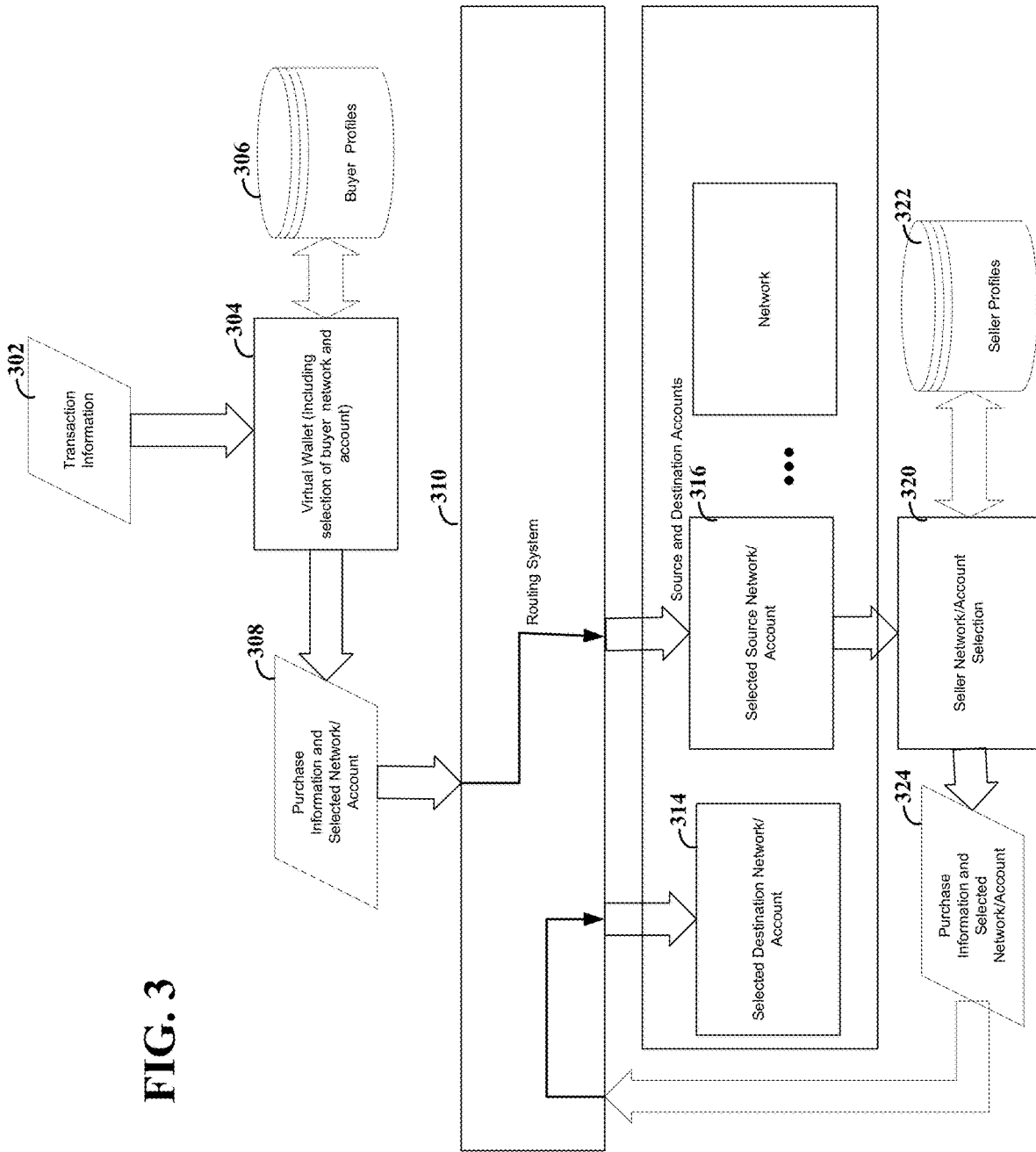
FIG. 3 shows a data flow diagram for network selection, according to an example embodiment of the present invention.

FIG. 3 shows a data flow diagram for an approach to electronic payment network selection and interaction, according to another example embodiment of the present invention. A virtual-wallet block 304 uses transaction information 302 together with buyer profiles 306 to generate or otherwise provide transaction data 308 including purchase data (e.g., a transaction amount and buyer account number), and information identifying a selected network and/or account information. Generally, the transaction information 302 is received from one or both of a seller and buyer participating in a transaction, such as via merchant-operated point-of-sale devices, and includes data identifying the seller, buyer and the transaction amount.

A routing system 310 receives and effectively routes the data 308 to a selected funding source network/account processing block 316 (or corresponding system), either by simply passing data or by configuring, altering and/or adding to the data 308 in a manner that is amenable to processing with the selected funding source, in accordance with the buyer and/or seller and the particular transaction. The selected network/account processing block 316 processes the routed information accordingly, by recording or withdrawing funds against a buyer's account, and by making those funds available to effect payment to the seller.

The transaction information 302 is also used to select a seller network/account system at block 320, with the information 302 received through block 316 and/or from the routing system 310, with one or both of serial and parallel communications approaches. Information such as seller profiles from a database 322 is used together with the transaction information 302 to select an appropriate account, and seller data 324 identifying the selected account and including appropriate transaction information is passed to the routing system 310. For instance, in some embodiments, the seller data 324 includes data for effecting an electronic funds transfer or other approach for providing funds from the source account 316. The routing system 310 passes the seller data 324 to a selected destination network/account 314 processing block (or corresponding system), which carries out appropriate seller functions.

The routing system 310 can thus route transaction data to both source and destination networks, which can overlap. For instance, a buyer and seller can both hold accounts in a proprietary network that processes prepaid transaction cards. For such instances, the selected source network could be the same or different from the selected destination network (e.g., relative to funds transfer), as specified via routing profile information or otherwise). In some embodiments, the routing system 310 includes separate and distinct routing systems respectively implemented for source and destination network routing (i.e., for buyer and seller network routing).

In another embodiment, a third party can collect from the source network while crediting the destination network, thereby executing electronic funds transfer for the transaction between the networks without a direct transfer or communication between the source and destination networks. This approach can be implemented, for example, where two disparate source and destination networks cannot communicate with one another or when such communication is undesirable. The third party effectively interacts with each network relatively independently, and the respective source and destination networks can then handle funds transfer (payment/settlement) with the buyer and seller.

Figure 4:
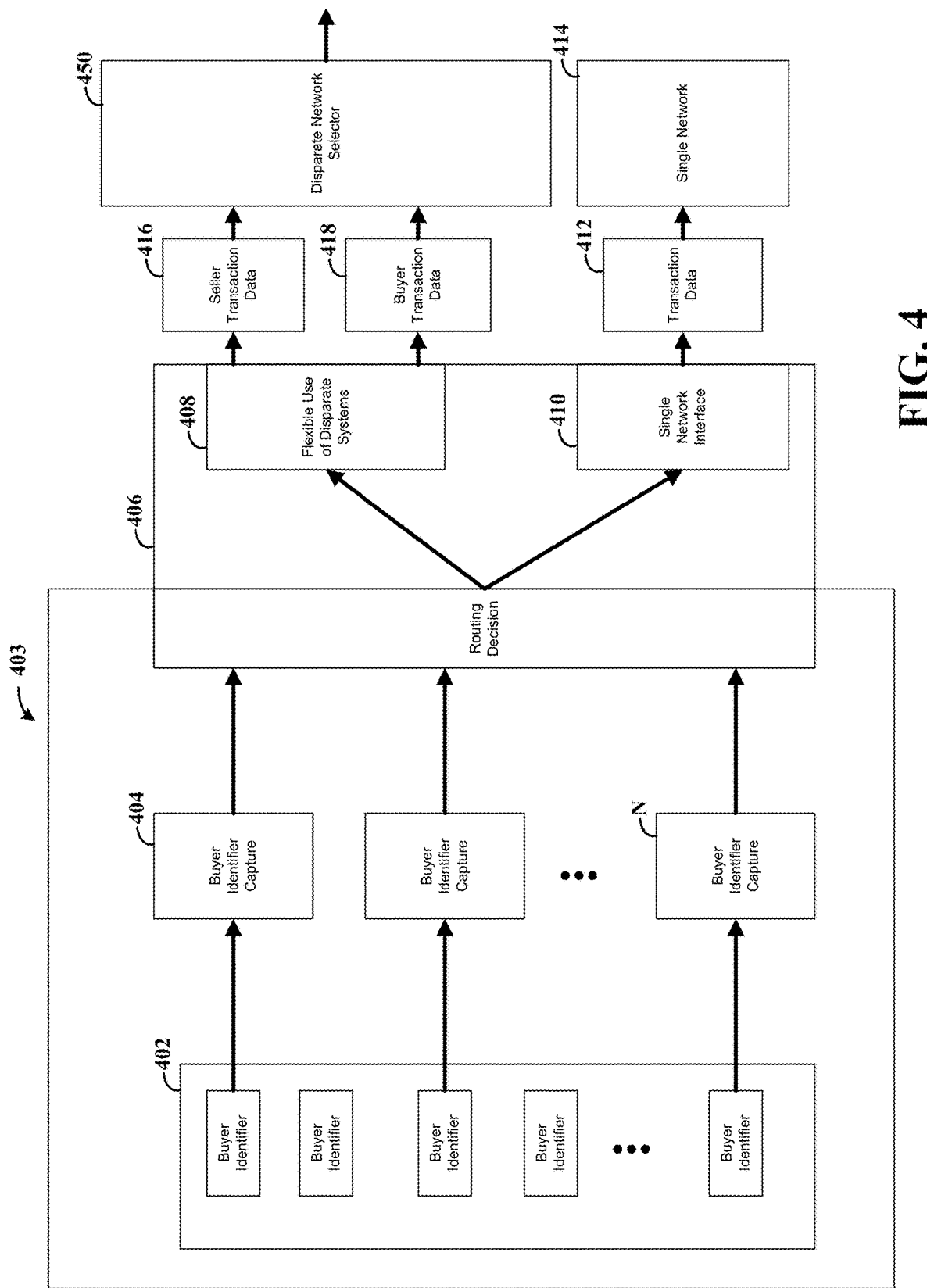
FIG. 4 shows an electronic buyer-seller interface system, according to another example embodiment of the present invention.

FIG. 4 shows a buyer-seller interface arrangement 403 for selective routing between disparate systems or a single system, according to another example embodiment of the present invention. The arrangement 403 may, for example, be implemented in connection with other embodiments discussed herein and shown in the figures (e.g., as interface 103 in FIG. 1). The interface arrangement 403 uses a number of buyer identifiers as shown at 402 to identify buyers and, more particularly, their respective accounts. These identifiers (e.g., numbers or other data) may pertain to credit cards, debit cards, prepaid cards, bank accounts, checks, identification cards, radio-frequency identification devices and smart cards, as well as identifiers relating to social security numbers and telephone numbers. Thus, a variety of approaches may be used to identify a particular account for a buyer for a transaction.

Buyer identifiers are captured at blocks 404-N to identify buyers participating in transactions, using one or more of a variety of approaches. One such capture approach involves using a card such as a credit card or an identification card bearing data using a magnetic strip, a circuit chip, a bar code or other approach. Another capture approach involves using an input from a buyer, such as a keyed-in account or an account otherwise made accessible via stored data and buyer authorization to access and use that stored data. These methodologies can be useful for allowing the use of existing seller-buyer interface technology. For example, the buyer can simply present a credit card, or an account number associated with the card, to a merchant that passes the information along for use in capturing an identification of the buyer.

After the buyer identifier is captured at one of blocks 404-N, a routing decision block 406 makes a decision as to how to route, or process, data for a transaction involving the identified buyer, with the data generally including the buyer identifier, the transaction amount and, in some instances, an identification of the seller. For instance, where a single network 414 is used (e.g., where the buyer and seller both participate in a common payment network or a closed network), transaction data 412 is routed to the network using a single network interface 410. This approach is amenable to implementation with a transaction card operating on a proprietary network that is associated with the card, with the transaction data 412 being routed directly to the proprietary network.

Where disparate networks are to be used respectively for the buyer and seller sides of a transaction, the routing decision block 406 routes separate seller (416) and buyer (418) transaction data to a disparate network selector block 450. Appropriate networks are then selected at block 450, respectively for the seller (receiving) and buyer (paying) sides of an electronic funds transfer. Where appropriate, the selector block 450 also effects appropriate data and other configuration to configure the transaction data 412, and any corresponding data from each respective system, so that the data is amenable to use at the appropriate networks. In these and other contexts, the selector block 450 may, for example, be implemented in a manner similar to that described with selector 150 above.

In many contexts, the buyer/seller interface system/approach shown in FIG. 4 can be useful for allowing backward compatibility to participants of preexisting networks and at the same time being compatible to participations of the disparate network system. This system/approach can also be useful for allowing participants of the disparate network system to use preexisting buyer identifiers to access the disparate network system.

In a more particular embodiment, the routing decision block 406 is implemented separately for buyer and seller sides of transactions, such that one of the buyer and seller can use the single network 414, while the other uses the disparate network system. In such an embodiment, transaction information can be sent to the single network 414 as well as the disparate network selection block 450 to allow for electronic funds transfer involving both the single network and the network selected at block 450. In one implementation, a third party identifier is sent to the single network 414 to identify a disparate network system used by the other of the seller and buyer. For example, seller-side transaction data may be sent to the single network, while buyer-side transaction data is sent to the disparate network system. A single network credits the buyer's account for the value of the transaction. The credit can be settled by collecting from the third party such as a financial institution. Buyer transaction data is sent to a selected buyer network, which can be disparate from the single network. The selected buyer network debits the appropriate account and provides a credit to the third party.

Another implementation involves sending data identifying a selected disparate network to the single network 414, with the single network 414 in turn using that information in effecting funds transfer. For instance, if seller transaction data is to be sent to the single network 414 (i.e., the seller's account is on the single network), while buyer transaction data is to be sent to a disparate network system, the disparate network system can send the selected buyer network information back to the buyer/seller interface, which in turn sends this information to the single network. The selected buyer network and single, seller network can then perform settlement according to established bilateral agreements, or through the system 403.

According to another embodiment, the routing decision block 406 uses feedback from one or more disparate network systems in selecting one of the systems to use for a particular transaction. In such embodiment, transaction data can be sent to one or more disparate network systems, which applies appropriate user profiles and/or business rules to the transaction data in responding the interface 403, and the response is used in making a routing decision.

In a particular embodiment, routing decision block 406 is carried out entirely at (and as part of) the buyer/seller interface 403. The routing decision can be made based upon a number of factors, such as the type of buyer identifier used, seller and/or buyer input to the interface, or profile and business rule information for the seller and/or buyer.

Figure 5:
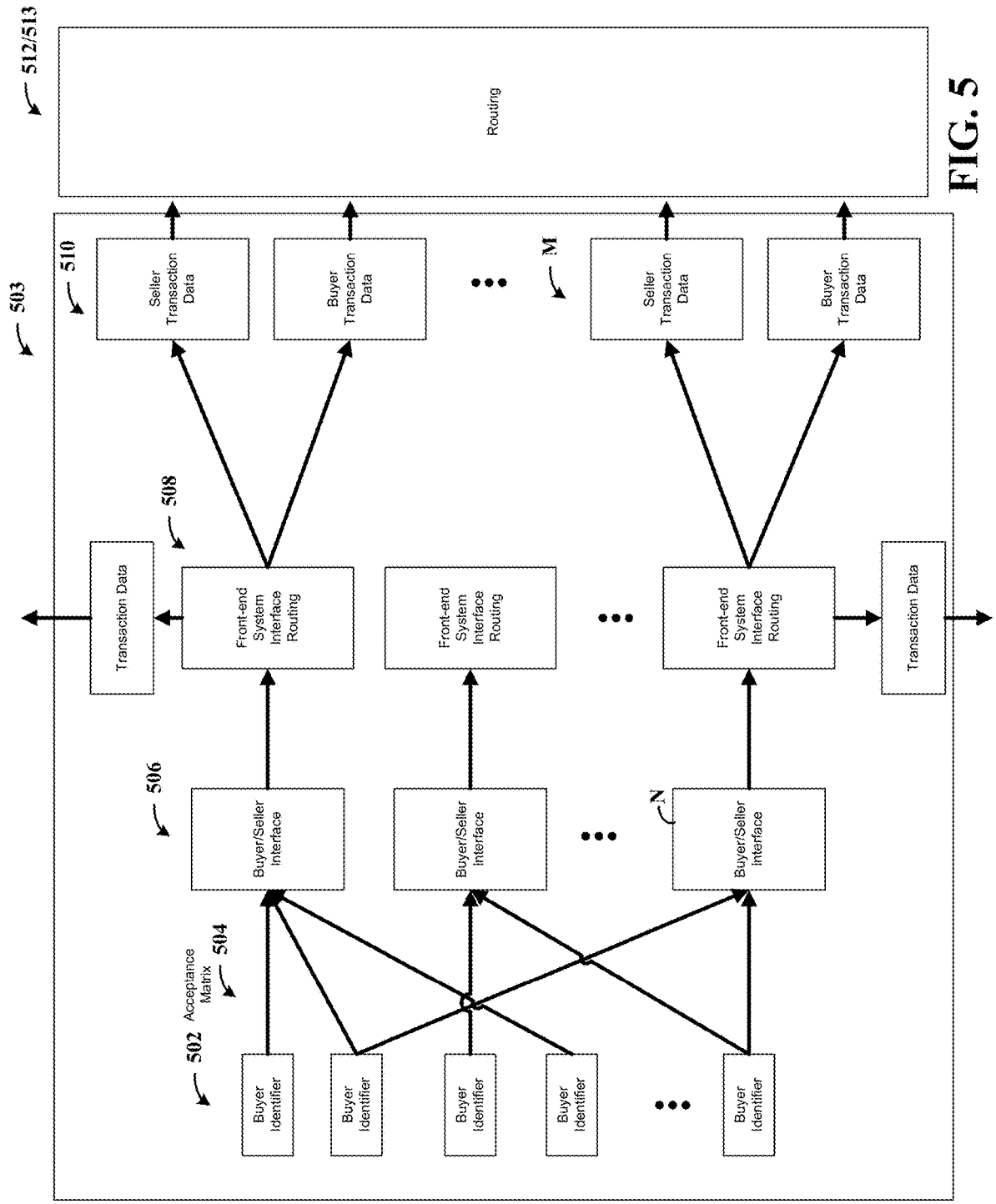
FIG. 5 shows another buyer-seller interface system, according to another example embodiment of the present invention.

FIG. 5 shows another buyer-seller interface arrangement 503 according to an example embodiment of the present invention. As with arrangement 403 in FIG. 4, arrangement 503 may be implemented in connection with other embodiments, such as those described with interface 103 above. When buyers make purchases, they use buyer identifiers 502 which may include one or more of variety of identifiers, such as those discussed above, carried by a transaction card, chip or otherwise provided. For instance, at least some of these identifiers may correspond to a type of identifier that is issued for use with a particular payment network; for example, VISA® credit cards issued for use with the VISA® payment network or proprietary cards issued for use with a corresponding proprietary payment network. As discussed above, such identifier types allow the buyer to use their identifier in making purchases, while not necessarily requiring that the purchase be made using an account associated with the identifier (i.e., a buyer account identifier can be used to identify a buyer and correspondingly select a different account and related payment network for payment processing).

Buyer-seller interfaces 506-N each accept one or more buyer identifier types as exemplified by acceptance matrix 504, and generate transaction data using the identifier types and related transaction information (e.g., price and seller identification). The interfaces 506 send the generated transaction data to front-end system interfaces 508, which in turn route the transaction data, directly and/or by configuring or processing the data (as shown at blocks 510-M), to one of a plurality of payment processing networks via disparate-network router system 512/513 (e.g., similar to 112/113 above). Routing may accordingly be carried out in a manner similar to that discussed, for example, in connection with FIG. 4 above.

The selection criteria used in selecting buyer and/or seller accounts in accordance with various embodiments discussed above may include a variety of other characteristics. For instance, account selection can factor in the type of buyer identification used, and may be different depending upon whether the buyer uses a credit card, a gift card, a mobile phone or some other identification. The selection criteria can also factor in balances in the buyer's accounts, such as by ensuring that a minimum or maximum (fixed or relative) balance is maintained in a certain account. The selection criteria may also involve ensuring that a certain dollar amount is not exceeded for extended credit. Other selection criteria involve an amount of fees that would be assessed for particular network and transaction options, such that a buyer can avoid accounts for which higher fees may apply, or to otherwise ensure that a transaction is processed as economically as possible. In another instances, account interest rates are used as selection criteria, which can be useful for avoiding the use of accounts having high interest rates. Other criteria relate to the total fees due to financial transactions necessary between selected buyer and seller accounts (e.g., to reduce and/or minimize fees). Still other criteria specify that the use of multiple accounts is undesirable or limited where possible, which can be helpful for simplifying a buyer's billing and payment options.

The selection of a seller network can also be based upon a number of different criteria, including seller profiles and business rules as discussed above, as well as other criteria similar to that discussed above. For instance, rules may specify that a certain account be used under certain conditions relating to such criteria. Example criteria include a transaction amount, transaction type, expected fees, a comparison of the seller's available networks, the type of seller (e.g., Internet seller, department store or utility company) and/or the buyer's information (e.g., the buyer's available networks/accounts, credit rating or account balances). Other criteria is based upon an assumption of risk for the transaction, such as in applications where certain networks underwrite the transaction and thereby assume responsibility for disputes, while other networks pass liability for all disputes directly to the seller. Other criteria relate to the buyer's reliability (or lack thereof). Still other criteria includes information regarding account balances in a particular network, such that a seller having a negative account balance can apply funds received from a buyer to that account (e.g., where the seller uses an account to both make and receive payments). Account consolidation is another type of criteria, which can be implemented to simplify the number of accounts that a particular seller has to monitor and use.

Transaction data is submitted to selected payment networks (e.g., for the authorization or the actual transaction and facilitation of payment) by submitting third party data (e.g., the system implementer) in place of the buyer data, such that the third party is used by the payment network for authorization/approval. Thus, the selected network will receive the funds to be credited to the seller from the third party, which in turn collects settlement from a buyer for the funds credited. In some implementations, information about the buyer's network is submitted and used for authorization/approval as discussed above. In both embodiments, data is appropriately formatted to match the selected seller network.

Settlement for payments using credit extended to a buyer can be implemented in a number of different manners. In some applications, a selected seller network receives payment directly from a buyer's account that is held within the buyer network. The selected seller network and related account provides a statement to seller noting the payment. In another example, a third party (e.g., the implementer of a system such as system 100 or 101) can provide a statement to the seller, with payment processed accordingly. The collection of funds from the buyer can be effected using a bilateral agreement between a buyer network and the selected seller network, or facilitated by a third party (e.g., the system implementer as above), which allows for the networks to establish a suitable settlement option between themselves.

In various embodiments, credit and/or debit functions are delayed to allow for future approval and/or future payment/settlement selection options. For instance, a third party system operator may hold transaction data and/or funds for a period of time before forwarding the transactional data to the selected network. Transactions can be authorized prior to network selection, which is useful, for example, when a buyer is purchasing goods from a merchant. During the delay period of time, participating buyers and sellers can select an appropriate network.

A specific embodiment of the present invention is implemented for use with buyers who subscribe to mobile phone services provided by a mobile phone service provider. In some implementations, the buyer uses the mobile phone and/or mobile phone account to effect a transaction, and based upon the buyer's account with the mobile phone service provider, a number of payment and settlement options are provided to the buyer. One settlement option includes charging the buyer's mobile phone account for a purchase, which can be useful for consolidating charges that the buyer makes with the mobile phone services into a single account and resulting bill. The mobile phone account can be selected as discussed above, such that the mobile phone and related account need not be used as an identification source (e.g., a phone user's credit card may be used). Other settlement options include using other accounts for the buyer as discussed above, which can alleviate the need for the buyer to carry additional account information (e.g., he or she simply needs to carry a mobile phone, and does not need to carry credit cards, debit cards or other account information).

Buyer identifiers that can be used with these mobile phone-based approaches include, for example, an external identifier such as a credit card number, or an internal identifier such as the buyer's mobile phone number. Applications involving a mobile phone account can thus be implemented in connection with above approaches, such as those described in connection with FIG. 1A and with FIG. 1B, with the buyer's mobile phone account being a possible selection for transaction processing and/or provision/collection of funds, with the mobile phone number being an example buyer identification.

In some instances, the mobile phone is used to make purchases, such as downloads, Internet purchases for products and/or services, or gasoline and department store purchase, with the mobile phone effectively acting as an interface and/or identification device (e.g., similar to a credit card). In such instances, the mobile phone identifier can be provided automatically by the mobile phone device or inputted manually by the buyer, with automatically provided identifiers implemented, for example, according to an available buyer-seller interface. In one application, an encrypted authorization code is sent to a buyer-seller interface during an Internet purchase. In another implementation, a radio-frequency-identification (RFID) chip is used to send an identifier to the buyer-seller interface during a POS sale.

A variety of authentication procedures can be implemented using a mobile phone-based approach. For instance, a secure code can be entered by a buyer or a secure identifier can be provided by the mobile phone and confirmed by the buyer. Confirmation can be obtained using a message sent and/or received at the mobile phone to confirm that a particular transaction is appropriate. Such a message may involve sending a confirmation text message from the phone, and using that message at a control system (e.g., as in the figures) to authenticate the transaction. Location-based messages or simply data may be used to confirm that the mobile phone is actually located at the point-of-sale.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include the implementation of various components by different entities who may or may not operate at arms length from one another. Other embodiments and implementations are directed to the combination of approaches described herein with the figures and/or otherwise, as well as those described in the above-referenced provisional application and in the claims. In addition, various embodiments are directed to a processor that executes code to carry out the steps and/or functions as described above, in connection with the figures or otherwise. A corresponding embodiment is directed to a computer system that communicates with a remote seller/merchant point-of-sale device to receive buyer identification data, seller identification data and a transaction amount, and to select and implement one or more of a variety of disparate buyer and/or seller accounts and related system using the received data. Such modifications and changes do not depart from the true spirit and scope of the present invention.

What is claimed is:

1. A computer-implemented method comprising:
   receiving, via at least one network selection circuit which includes a computer processor, a first set of electronic transaction data transmitted from a point-of-sale (POS) system associated with a seller over a first network, wherein the first set of electronic transaction data includes indications of: a transaction value and an account linked to a user;
   retrieving user profile data associated with the user and seller profile data associated with the seller;
   automatically selecting a user network from a plurality of autonomous electronic networks based on the user profile data;
   automatically, using user network profile configuration information for the user network of the plurality of autonomous electronic networks, configuring a user network data format of the first set of electronic transaction data to generate user network configured electronic transaction data;
   providing, via a user network communication protocol associated with the user network profile configuration information, the user network configured electronic transaction data to the user network of the plurality of autonomous electronic networks;
   automatically selecting a seller network from the plurality of autonomous electronic networks based on the seller profile data;
   automatically, using seller network profile configuration information for the seller network of the plurality of autonomous electronic networks, configuring a seller network data format of the first set of electronic transaction data to generate seller network configured electronic transaction data, wherein the seller network is different than the user network and the user network data format is different than the seller network data format; and
   providing, via a seller network communication protocol associated with the seller network profile configuration information, the seller network configured electronic transaction data to the seller network of the plurality of autonomous electronic networks.

2. The computer-implemented method of claim 1, further including, for the first set of electronic transaction data, auditing the first set of electronic transaction data according to audit conditions specified by an entity to which the first set of electronic transaction data is transmitted over the first network.

3. The computer-implemented method of claim 2, further including, for the first set of electronic transaction data, providing at least the user network configured electronic transaction data based on the auditing of the first set of electronic transaction data.

4. The computer-implemented method of claim 2, wherein auditing the first set of electronic transaction data includes auditing based on a value associated with the account.

5. The computer-implemented method of claim 1, further including, for the first set of electronic transaction data, configuring at least the user network configured electronic transaction data with authorization data and therein conveying an increase in a value associated with a receivable account for the seller and a corresponding decrease in a value associated with the account linked to the user.

6. The computer-implemented method of claim 1, further including, for the first set of electronic transaction data, modifying operation of a transaction processing circuit, that is communicatively coupled to or integrated with the at least one network selection circuit, to comply with operational requirements of the seller network of the plurality of autonomous electronic networks.

7. The computer-implemented method of claim 1, further including transmitting over a communications network, including at least one of the Internet and a mobile communications network, the first set of electronic transaction data from the first network of a plurality of autonomous electronic networks.

8. The computer-implemented method of claim 1, further including transmitting over a communications network, for the first set of electronic transaction data, data to effect a payment using the user network and the seller network of the plurality of autonomous electronic networks.

9. The computer-implemented method of claim 1, further including retrieving, via computer processing circuitry communicatively coupled to or integrated with the at least one network selection circuit, the user profile data and business rules associated with the user network of the plurality of autonomous electronic networks.

10. The computer-implemented method of claim 9, wherein at least one of the user profile data and the business rules involve a bilateral agreement with the user network of the plurality of autonomous electronic networks.

11. The computer-implemented method of claim 1, further including conducting, via computer processing circuitry communicatively coupled to or integrated with the at least one network selection circuit, an audit of at least one set of electronic transaction data based on a value associated with the account for which said at least one set of electronic transaction data is operated on.

12. The computer-implemented method of claim 1, wherein the plurality of autonomous electronic networks include at least two transaction processing networks that are not recognized or otherwise accessible by other ones of the plurality of autonomous electronic networks.

13. The computer-implemented method of claim 1, further including processing the user network configured electronic transaction data, via computer processing circuitry communicatively coupled to or integrated with the at least one network selection circuit, by including payment authorization data within the user network configured transaction data based on an audit.

14. The computer-implemented method of claim 13, wherein the payment authorization data is used by the computer processing circuitry to facilitate effecting a payment involving the user network configured electronic transaction data.

15. The computer-implemented method of claim 1, further including, the first set of electronic transaction data, modifying operation of a transaction processing circuit to comply with operational requirements of the user network of the plurality of autonomous electronic networks, wherein the transaction processing circuit comprises computer processing circuitry communicatively coupled to or integrated with the at least one network selection circuit.

16. The computer-implemented method of claim 1, wherein the plurality of autonomous electronic networks include at least one transaction processing proprietary network.

17. The computer-implemented method of claim 1, wherein the plurality of autonomous electronic networks include at least one transaction processing association network.

18. The computer-implemented method of claim 1, further including, for the first set of electronic transaction data, configuring at least the user network configured electronic transaction data with authorization data and therein conveying an increase in a value associated with a receivable account for the seller and a corresponding decrease in a value associated with the account linked to the user.

19. A system comprising:
    at least one network selection circuit, including a computer processor, configured to:
    receive a first set of electronic transaction data transmitted from a point-of-sale (POS) system associated with a seller over a first network, wherein the first set of electronic transaction data includes indications of: a transaction value, a user, and an account linked to the user;
    retrieve user profile data associated with the user and seller profile data associated with the seller;
    automatically select a user network from a plurality of autonomous electronic networks based on the user profile data;
    automatically, using user network profile configuration information for the user network of the plurality of autonomous electronic networks, configure a user network data format of the first set of electronic transaction data to generate user network configured electronic transaction data;
    provide, via a user network communication protocol associated with the user network profile configuration information, the user network configured electronic transaction data to the user network of the plurality of autonomous electronic networks;
    automatically select a seller network from the plurality of autonomous electronic networks based on the seller profile data;
    automatically, using seller network profile configuration information for the seller network of the plurality of autonomous electronic networks, configure a seller network data format of the first set of electronic transaction data to generate seller network configured electronic transaction data, wherein the seller network is different than the user network and the user network data format is different than the seller network data format, and
    providing, via a seller network communication protocol associated with the seller network profile configuration information, the seller network configured electronic transaction data to the seller network of the plurality of autonomous electronic networks.

20. The system of claim 19, wherein the at least one network selection circuit is further configured to, for the first set of electronic transaction data, audit the first set of electronic transaction data according to audit conditions specified by an entity to which the first set of electronic transaction data is transmitted over the first network.

* * * * *